(12) United States Patent
Reynolds

(10) Patent No.: US 11,366,529 B1
(45) Date of Patent: Jun. 21, 2022

(54) GESTURE BASED DATA CAPTURE AND ANALYSIS DEVICE AND SYSTEM WITH STATES, CONFIRMATORY FEEDBACK AND TIMELINE

(71) Applicant: Steven Reynolds, Chicago, IL (US)

(72) Inventor: Steven Reynolds, Chicago, IL (US)

( * ) Notice: Subject to any disclaimer, the term of this patent is extended or adjusted under 35 U.S.C. 154(b) by 0 days.

(21) Appl. No.: 17/375,057

(22) Filed: Jul. 14, 2021

(51) Int. Cl.
  *G06K 9/00* (2022.01)
  *G06F 3/01* (2006.01)
  *G06F 3/0346* (2013.01)

(52) U.S. Cl.
  CPC .............. *G06F 3/017* (2013.01); *G06F 3/016* (2013.01); *G06F 3/0346* (2013.01); *G06F 2203/0331* (2013.01)

(58) Field of Classification Search
  None
  See application file for complete search history.

(56) References Cited

U.S. PATENT DOCUMENTS

| | | | | |
|---|---|---|---|---|
| 9,171,198 | B1 * | 10/2015 | Raffle | ...................... G06F 3/012 |
| 9,207,759 | B1 | 12/2015 | El Dokor | |
| 11,150,800 | B1 * | 10/2021 | Longest | ................ G06F 3/0233 |
| 2005/0212760 | A1 | 9/2005 | Marvit | |
| 2008/0170748 | A1 | 7/2008 | Albertson | |
| 2011/0216209 | A1 | 9/2011 | Fredlund | |
| 2012/0239396 | A1 | 9/2012 | Johnston | |
| 2013/0335640 | A1 | 12/2013 | Watanabe | |
| 2014/0201689 | A1 | 7/2014 | Bedikian | |
| 2015/0229837 | A1 | 8/2015 | Her | |
| 2015/0253847 | A1 | 9/2015 | Harris | |
| 2015/0309582 | A1 | 10/2015 | Gupta | |
| 2015/0346899 | A1 | 12/2015 | Jung | |
| 2017/0076415 | A1 | 3/2017 | Ng-Throw-Hing | |
| 2017/0336963 | A1 | 11/2017 | Lee | |
| 2019/0354191 | A1 | 11/2019 | Reynolds | |
| 2022/0084081 | A1 * | 3/2022 | Glenn | ................ G06Q 30/0206 |

\* cited by examiner

*Primary Examiner* — Carl Adams

(57) ABSTRACT

A gesture based data capture and analysis system includes one or more gesture units, one or more feedback units, and an analysis unit. The system operates in one or more states, which control if and how it responds to gestures depending on the active state. The gesture units are affixed to a user's hand, wrist, and/or fingers and sense movement as gesture data. The analysis unit interprets the gesture data and uses that data to control both the capturing of data by the peripherals and the processing of the captured data. The analysis unit also keeps a list or history of gestures, data captured, and/or active states to allow a user to review a timeline such information. The feedback units provide real time feedback to the user identifying information such as the type of gesture interpreted or detected, the state of the system, or the type or contents of data from the peripheral.

20 Claims, 6 Drawing Sheets

| ID | Compa-tibility | Path | Action |
|---|---|---|---|
| C1 | a | 1 →<br>2 ← | Capture image |
| C2 | a | (arc path) | Capture audio |
| C3 | a | (arc path) | Capture video |
| ... | | | |
| CN | b | Custom path | Capture at other sensor |
| P1 | a, b | (path diagram) | Process capture file and store without raw data |
| P2 | a | (circular path) | Process gesture file and send to preset device or website |
| P3 | a, b | (circular path) | Process most recently capture data for display on analysis unit |
| ... | | | |
| PN | ... | Custom pata | Custom processing capture image and sensor |
| ... | | | |
| SN | ... | C1, CN | |

FIG. 3

GESTURE BASED DATA CAPTURE AND ANALYSIS DEVICE AND SYSTEM WITH STATES, CONFIRMATORY FEEDBACK AND TIMELINE

BACKGROUND OF THE INVENTION

Mobile user electronics (such as mobile phones, digital video and audio recorders, and other sensors) allow users to capture, store, transmit, display, and otherwise process information around them. However, executing these actions using one or more peripherals can be cumbersome for a user; often it involves a user pulling out a device and holding it in the user's fingers to interact with buttons or a keyboard, which confines the user's attention.

BRIEF SUMMARY OF THE INVENTION

The present invention relates to a gesture based data capture and analysis system. In one embodiment, a handheld or wearable gesture unit is affixed to or carried by a user. The gesture unit contains a gesture-sensor, such as one or more motion detectors (e.g., accelerometers and/or an image analysis device), and communicates with one or more peripherals and an analysis unit. "Peripheral" means a device or sensor (such as a camera, video recorder, audio recorder, or other analog or digital sensing unit, including a mobile device that contains peripherals of its own) that is capable of capturing data that can be stored in memory. The gesture unit senses movement of a user's arms, hands, and/or fingers. In one embodiment, a gesture unit is worn on the front of a user's wrist (the palm side) and contains a camera and microphone as well as motion detectors (e.g., accelerometers). In this embodiment, after the user completes a gesture with the user's palm facing away from his or her body, the camera and microphone are in position (aimed at) the sound, imagery, or other data to be captured.

The gesture unit is electrically connected to ("connected" meaning directly or indirectly connected, intermittently or continuously connected, or by physical connection, wireless connection, or any combination of the foregoing) the analysis unit, which contains a processor capable of running software code, memory, input/output port, network interface (e.g., a wireless network adapter, cellular communication device or baseband chip, USB, Bluetooth, and/or near field communication device). The gesture unit and the analysis unit may be included in the same housing and/or be connected wirelessly or by wire. In response to gestures by a user, the gesture unit detects the gesture as gesture data and sends the gesture data to the analysis unit. The analysis unit responds depending upon what gesture ID corresponds to the gesture data. For example, if the gesture data corresponds to a request to capture data (e.g., image, audio, or video capture), the analysis unit causes one or more peripherals to capture data. The analysis unit stores the captured data (e.g., image, audio, or video) in memory as a capture file, to which it appends gesture information and/or other processing information and/or processing instructions to create a gesture file.

"Processing," when used in connection with "instruction(s)" includes functions performed with discretionary user input that indicates user a preference or choice. This can occur in a number of ways, such as, for example, according to user real-time instructions and/or previously entered instructions in the form of customizable settings. Some examples of such processing include modifying the look or feel of data or a file (e.g., the tint, of an image, size of an image, filter for an image, or cropping of images, audio, or video); captioning data or a file with text, filters, emojis, and/or annotations; and/or sending data or a file to a desired server, application programming interface, and/or other recipient for purposes such as display, publication, and/or posting to a social media website. The foregoing are explanatory examples that demonstrate user discretion or preference being manifested in the form an instruction (or carried out via an instruction) instead of route mechanical processes. Indeed, "processing," when used in connection with "instructions," does not include routine, inherent, automatic processes such as, for example, the simple storing a raw data file in the memory of a device after that device captures the data (which is inherently necessary), updating standard metadata without discretionary input from a user (e.g., updating the "created," "modified," or "accessed" date associated with a file or in the file's metadata), keeping records in routine server or security logs, or the automatic backing up of data on a cloud server.

"File" means any set of data stored in memory that is appended together. This includes, for example, data sets or databases that are distributed across different networks or servers. "Append" means that two or more data are associated or related in a way that a CPU or processor can interpret or recognize the association; to the extent it is necessary to delete or alter current data in order to successfully "append" new data, such actions are encompassed by the term "append."

The analysis unit appends to the capture file information related to the circumstances in which each set of data was captured; such as, for example, information related to the user's position at the time of capture and information that results from further processing by the analysis unit. In another embodiment, the analysis unit processes the gesture file (or the original capture file) to determine whether the captured data constitutes or comprises one or more of an image, video, audio, text, speech, song, or other recognizable category(ies) of data. In another embodiment, the analysis unit processes the capture file based upon the category(ies) of information received. For example, if an image is detected, the analysis unit determines whether a person's face or persons' faces are depicted in the image, whether the image is two-dimensional (e.g., an image of a text-based document), or other data or image processing known in the art. As another example, if an audio file is detected, the analysis unit determines whether the audio contains speech, music or lyrics, or other type of noise, vibration, or sensory input. If speech is detected, the analysis unit converts the speech to text using known speech recognition algorithms. If music or lyrics are detected, the analysis unit recognizes the song or music using known techniques. The foregoing information, as processed by the analysis unit, is appended to the capture file to create a gesture file; or, if a gesture file has already been created, the analysis unit modifies the gesture file as needed by appending processed information to the file (which includes, if necessary, removing or altering other information in it).

In other embodiments, the gesture unit, in connection with the analysis unit, interprets sequence gestures, combined gestures, timing gestures, speed gestures, contrasting gestures, handshake gestures, relational gestures, and/or complex gestures. For example, one gesture (e.g., a lateral motion of one of a user's hands across the body, back and forth) may be detectable by the gesture unit and, when detected, is sent to the analysis unit as gesture data and interpreted by the analysis unit as a request to capture an image. Upon receipt of the gesture data, the analysis unit sends a signal to a camera peripheral to capture an image. In one embodiment, another, subsequent gesture could be used to cause the analysis unit to send a signal to a microphone to capture audio and then translate such audio into text and include the text in, along side, or otherwise in relation to (e.g., as a caption) to the image. Another, subsequent gesture (e.g., moving a user's hand in a counter-clockwise, 360 degree circular motion starting at midnight) is detectable by the gesture unit and, when detected, is sent to the analysis unit as gesture data, and interpreted by the analysis unit as a request to send the captured image, with the caption, to a website. Upon receipt of that gesture data, the analysis unit sends the image, with the caption, to a website for publishing. Alternatively, if a public display gesture is detected, the image is sent to a public display screen(s).

In another embodiment, two or more gesture units are used to create more options for gestures. For example, in one embodiment, a user wears one gesture unit on each hand and additional gesture units on two fingers on each hand. When finger gesture units are used, the gestures created by the user's fingers can be used, for example, to send a command to initiate gesture sensing and/or to cancel capture. For example, in one embodiment, a user moves one or more fingers quickly toward their palm to instruct the gesture unit to start recording or attempting to detect gesture data. Alternatively, this finger-to-palm ("trigger") gesture instructs the analysis unit to start interpreting ("listening" to) gesture data output by one or more gesture units—so as to save processing power when the user does not intend gestures to be interpreted or acted upon. These options also prevent erroneous capture gestures from being detected or interpreted.

Alternatively, the finger-to-palm gesture can be used initiate a photo capture or other capture. This embodiment is particularly advantageous to users who wish to quickly capture data with minimal movement of the extremities. It should be noted that the finger-to-palm gesture could be used to control some or all of the above actions in embodiments where the analysis unit operates in multiple states where the states are characterized or defined by which gesture or set of gestures the analysis unit will consider or act upon when in that state. For example, the finger-to-palm gesture might initiate a photo when the analysis unit is in a photo-ready state, but might instruct the analysis unit to switch from a resting state (e.g., to save battery power and accept no gestures other than the finger-to-palm gesture) to a photo ready state.

In one embodiment, finger gestures are used to control the method of capture; such as, for example, controlling zoom or focus during image or video capture, directional audio capture, or other capture criteria. In one embodiment, a serial photo gesture is used (e.g., three swipes of the hand back and forth—similar to gesture C1 in FIG. 3 but with a third motion back to the right) to instruct a camera peripheral to capture a number of photos in seriatim, while opening and closing of the user's fingers controls the zoom level as each photo is taken (e.g., closing fingers might indicate zooming in before the next photo capture in the series and opening fingers might indicate zooming out before the next photo capture in the series). The same zooming in and out feature applies to video captures. In another embodiment, finger gestures (e.g., tapping two fingers together) indicates that the user intends to photograph an image with text for OCR (e.g., if a user desires to photograph a document or business card) or an image to be decoded (e.g., a bar code or QR code). Similarly, if a directional microphone or other audio sensor is connected, moving the fingers in and out can be used to control the depth and/or sensitivity of audio detection.

In one embodiment, the analysis unit is connected to a feedback unit that is affixed to a user but not held in the user's grip. The feedback units provide real time feedback to the user identifying information such as the type of gesture interpreted or detected, the state of the system, and/or the type or contents of data captured by the peripheral. "Affixed to" means directly or indirectly affixed to; it includes, by way of non-limiting example, a watch worn over a user's sleeve or other container or holder worn over a user's clothes (such as a purse). The combined term "affixed to or carried by" describes such affixed objects, as well as those that are carried (e.g., in a pocket or holder), such that a user can freely bring any of the foregoing objects from place to place in the ordinary course of the user's day, such as, for example, personal devices, backpacks and objects in them, watches, rings, bracelets, anklets, belts, purses and objects in them, hats, glasses, ear buds, headphones, mobile phone holders (e.g., on belts, arms, or legs) and other similar devices.

The term "user's grip," used in connection with how a device is held, does not include gesture devices attached to a user's fingers (e.g., rings) where the user's hand is free to hold and control other devices or move the user's fingers. Devices in a "user's grip" are, for example, those that the user must hold between one or more fingers and the user's palm in order to operate (e.g., certain cameras) such that it would be difficult for the user to hold or control other devices or to otherwise use the user's fingers.

In one embodiment, the analysis unit is electrically connected to at least one non-visual feedback unit. The non-visual feedback unit provides feedback to the user regarding the state of the analysis unit, gestures, captured data, processing, instructions, and/or other functions conducted by the peripheral, analysis unit, or gesture unit. The non-visual feedback unit can be a haptic feedback unit and preferably provides real-time tactile or haptic feedback to the user. Haptic feedback can be for example, force, vibrotactile, electrotactile, ultrasound, and/or thermal feedback. As one non-limiting example, the haptic feedback unit provides different vibrations indicating which gesture the gesture unit or analysis unit interpreted. For example, if a user intended to make a gesture instructing the peripheral to capture a photo, the non-visual feedback unit may provide a long vibration to indicate that the gesture associated with photo capturing was either detected or interpreted such that a capture event would begin. The non-visual feedback unit may also provide distinct haptic feedback indicating that the capture event was completed. It may also provide distinct haptic feedback demonstrating that the analysis unit conducted certain processing on the captured data (e.g., in response to another gesture).

In other embodiments, the feedback unit is either a visual or auditory feedback unit or is connected to a visual or auditory feedback unit. A visual feedback unit, for example, could include a display, LED, heads up display (e.g., via glasses or visor), or other visual indicator. An auditory feedback unit might send audio responses or signals through, for example, speakers or head phones.

In other embodiments, the feedback unit could be any combination of the foregoing or connect to any of the foregoing. As one example, LEDs could be used to indicate states (via visual feedback), and haptic feedback could be used to indicate the type of data being captured or gesture being interpreted—or vice versa. Additionally, audio feedback could be used to provide to the user requests for input, instructions, or information about the gestures or states or further processing. Again, it should be understood that one of ordinary skill in the art could use any of the foregoing types of feedback units for any of the aforementioned functions or other functions used by the capture device or processing.

In other embodiments, multiple non-visual feedback types may be provided (e.g., via multiple feedback units or a combined feedback unit). For example, a non-visual feedback unit (e.g., providing haptic feedback) may be connected to each gesture unit to provide the user an indication of the gesture being detected or interpreted or even the individual movement of the gesture unit being detected or interpreted. For example, gesture units might vibrate with high frequency if two gesture units are spread apart and vibrate with lower frequency as they are brought together. This might, for example, notify a user that a zoom-in or zoom-out gesture is being interpreted. Such feedback could be provided in connection with any gesture or combination of gestures described herein. Many types of tactile or haptic feedback, in a variety of devices, are well known. Just one example, in the form of a glove with "tactile actuation assemblies" is disclosed in U.S. Pat. No. 9,104,271B1. It also demonstrates the exemplar zoom-in or zoom-out function described here. U.S. Pat. No. 9,104,271, at 20:8-13.

In another embodiment, a distinct gesture can be used to confirm the tactile or haptic feedback. For example, if a user intends to capture a photograph and the non-visual feedback unit provides feedback identifying that a photo capture gesture was interpreted, the user may provide a confirmatory gesture. In one embodiment, the confirmatory gesture must be provided prior to the capture taking place. In another embodiment, the confirmatory gesture must be provided only before captured data is transmitted, published, or displayed. Alternatively, the confirmation could be provided via any other user interface on the analysis unit or gesture unit. This confirmatory feedback can be applied to any gesture, capture, or processing function.

In another embodiment, the selection of gestures, feedback, and associated capture or processing functions are selected such that the user can interact with the gesture unit or analysis unit in real-time without relying upon devices held in the user's grip.

In another embodiment, tactile or haptic feedback is not provided until the analysis unit or gesture unit is instructed to begin interpreting ("listening" to) gesture data output by one or more gesture units.

In another embodiment, auditory feedback is provided via a speaker, headphone, ear bud, or other like device.

BRIEF DESCRIPTION OF THE DRAWINGS

FIG. 3 shows an exemplary gesture database with gesture-ID column, compatibility identifier, gesture path, and action description.

DETAILED DESCRIPTION OF THE INVENTION

Figure 1:
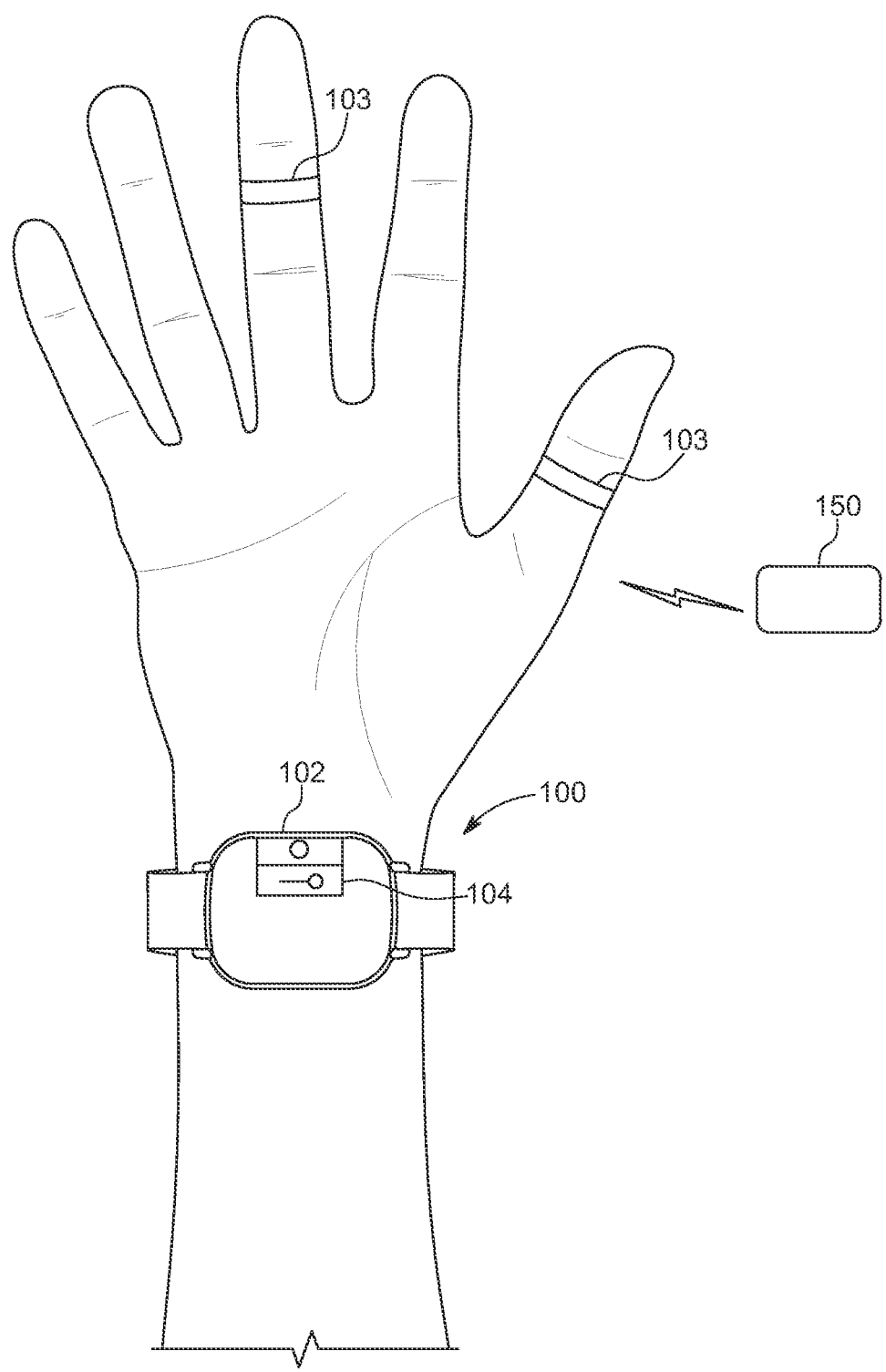
FIG. 1 depicts the palm-side of one embodiment of a gesture unit and analysis unit of the gesture based data capture and analysis system.

FIG. 1 depicts the outer portion of one embodiment of a gesture unit 100 and analysis unit 150 of the gesture based data capture and analysis system—or Gesture-Based System ("GBS") for short. The gesture unit is shown attached to the wrist of a user where the user's palm faces out of the page. In this embodiment, the gesture unit contains a camera 102 and microphone 104. The analysis unit is carried by or affixed to a user; in one embodiment, it can be affixed behind the gesture unit (such as, for example, on the back side of the user's wrist). In one embodiment, the analysis unit includes an audio codec associated with the microphone and a camera codec, image codec, and/or a video codec associated with the camera. The GBS of FIG. 1 also includes additional optional gesture units 103 (which each include at least one or more accelerometers, a power source, a logic unit or processor, and a transmitter-similar to those components described in connection with the gesture unit 150 in FIG. 2 except, in some embodiments, without the peripheral camera, sensor, or mic); in one embodiment, an optional gesture unit is affixed to the thumb and third finger (middle finger). In another embodiment, the gesture unit detects gestures and sends gesture data to the analysis unit, all processing is done by the analysis unit, and all capture is controlled by the CPU of the analysis unit (see FIG. 2).

Figure 2:
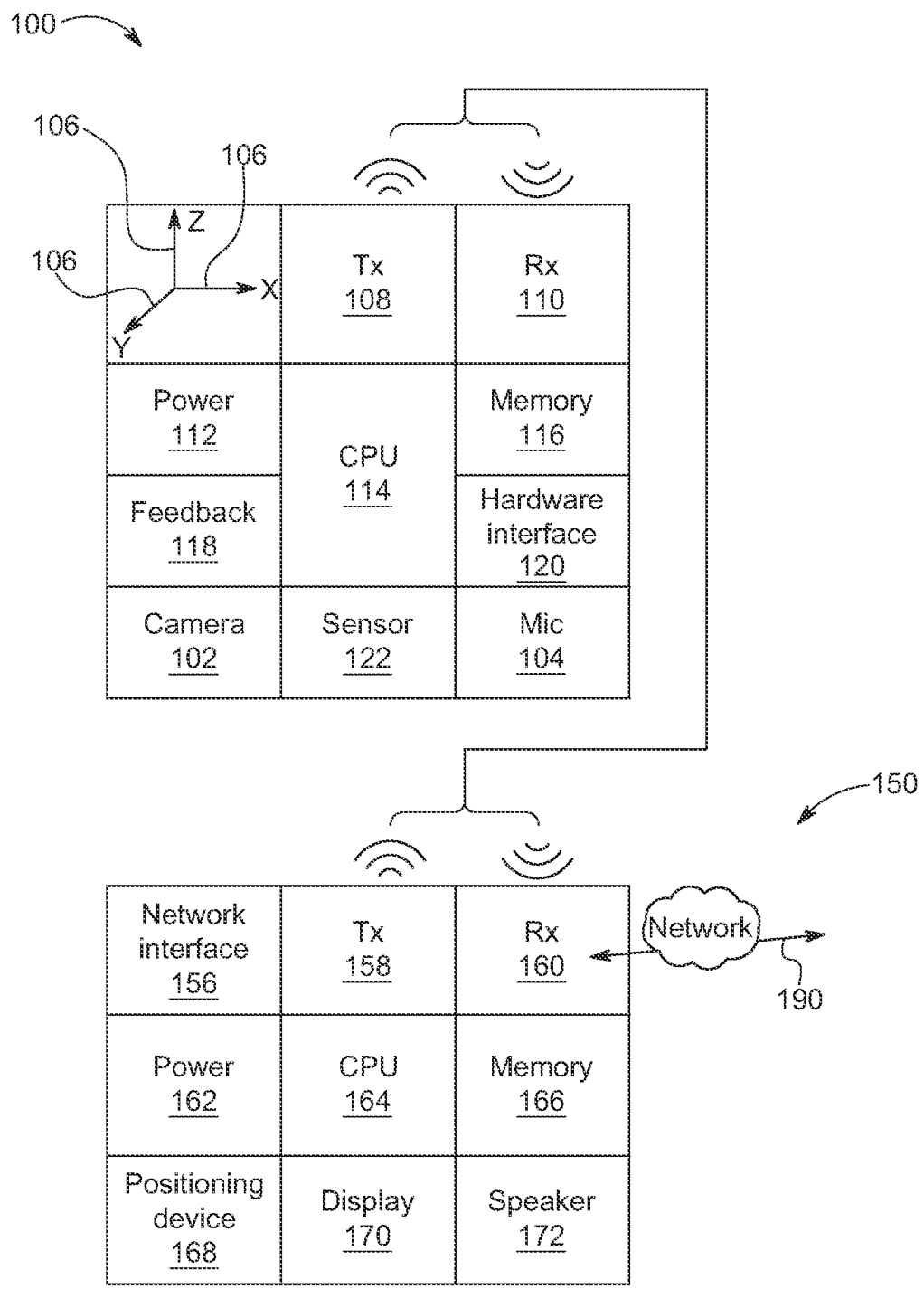
FIG. 2 is a block diagram the components of one embodiment of the gesture-based data capture and analysis system.

FIG. 2 is a block diagram of one embodiment of the GBS. In this embodiment, the GBS includes a gesture unit 100, which contains three orthogonal accelerometers 106($x$), 106($y$), and 106($z$) transmitter 108, receiver 110, power supply 112, CPU 114, memory 116, feedback mechanism 118, hardware interface 120, and optional additional peripheral(s) or sensor(s) 122. It will be understood that the accelerometers can be translational accelerometers, gyroscopes, or any type of motion detecting device or sensor. Any number or arrangement of accelerometers or other motion detectors can be used-depending upon the nature and number of gestures sought to be detected and interpreted. For example, in an alternative embodiment, a motion capture device, such as one or more cameras, or a multi-angle camera (see, e.g., U.S. Patent Application No. 20110006991, which is incorporated herein by reference) connected to an image processor may be affixed to the palm or wrist of a user to record the movement of the user's fingers; or motion detection devices may be affixed to one or more of the user's fingers or other part of the body (see, e.g., U.S. Patent Application No. 20040263473, which is incorporated herein by reference). The transmitter is preferably a radio transmitter that transmits message packets wirelessly. The receiver is preferably a radio receiver that receives message packets wirelessly. The term "CPU" shall be broadly construed to include one or more digital microprocessors, field programmable gate arrays (FGPAs), or any kind of digital or analog logic device, whether centralized or distributed.

The CPU 114 is electrically connected to the camera 102, mic 104, accelerometers 106, transmitter 108, receiver 110, power supply 112, CPU 114, memory 116, feedback mechanism 118, hardware interface 120, and one or more optional peripherals or sensors 122. In one embodiment, the power supply is a rechargeable battery. Optional sensors may include any measuring or sensing device such as, for example, temperature or pressure sensor, motion sensor, heat or infrared sensor, and/or any other analog or digital sensing device. If the sensor operates in the analog domain, one or more analog-to-digital converters and coding/decoding devices may be used to convert the readings into digital format before being sent to the CPU. Alternatively, a separate conversion unit may be provided between the sensor and the CPU or as part of the CPU.

The accelerometers 106(*x*), 106(*y*), and 106(*z*) detect movement of the gesture unit; those movements are interpreted by the CPU 114, using known methods, such as, for example, those disclosed in U.S. Patent Application Publication No. 20110199292A1 (application Ser. No. 12/707, 799); U.S. Application Publication No. 20080013826; U.S. Pat. Nos. 6,804,396; 6,990,639; and/or 8,819,812—each of which is incorporated herein by reference.

With continued reference to FIG. 2, the analysis unit includes a network interface 156, transmitter 158, receiver 160, power supply 162, CPU 164, memory 166, positioning device 168 (such as a GPS receiver or other global or inertial positioning device), display 170, and speaker 172. The CPU 164 is electrically connected to the network interface 156, transmitter 158, receiver 160, power supply 162, memory 166, positioning device 168, display 170, and speaker 172. In one embodiment, the analysis unit is capable of connecting to one or more networks 190 (e.g., the Internet), such as, for example, by using the transmitter 158 and receiver 160 or the network interface 156. The gesture unit and the analysis unit communicate via signals from the transmitter 108 to receiver 160 and via transmitter 158 to receiver 110. The communications are preferably wireless, but could also be wired (e.g., via a bus or USB connection). Any number of known wireless communications standards capable of sending and receiving information or data packets can be used—such as, for example, broadcast AM or FM radio, microwave communication, Wi-Fi, Bluetooth, Bluetooth Low Energy, NFC, Zigbee, WiMax, IrDA, and/or technologies listed by the Institute of Electrical and Electronics Engineers (IEEE) for machine-to-machine (M2M) communication (e.g., IEEE 802 technologies).

The display 170 can be a standard mobile display, such as those used on mobile phones. Alternatively, smaller, simpler, lower-resolution, less expensive, and/or lower powered displays can be used such as, for example, to reduce battery consumption.

In one embodiment, the accelerometers 106(*x*), 106(*y*), and 106(*z*) of the gesture unit 100 detect motion as gesture data. The CPU 114 sends the gesture data to the transmitter 108, which transmits the gesture data to the receiver 160 of the analysis unit. The CPU 164 of the analysis unit interprets the gesture data to determine the path of the gesture unit, as known in the art and disclosed in the above-cited references. The CPU stores the identity of the gesture path in memory. In one embodiment, the paths are stored as values in a database or lookup table and referenced by values stored in alphanumerical or numerical index variables, such as those displayed in FIG. 3. For example, such index variable might be defined as a column in a table (as in FIG. 3) or another field in a matrix, tabulation, or other set of data.

FIG. 3 shows an exemplary gesture database with gesture-ID column 302, compatibility identifier 303, gesture path 304, and associated action 306. The ID column provides an alphanumeric or numeric identifier of the gesture. These IDs classify or categorize gestures and/or associate one or more gestures together. The compatibility identifier 303 checks whether gestures are compatible with one another. In the example shown in FIG. 3; C1, C2, and C3 are compatible with processing gestures P1, P2, and P3 (as each include the designation "a")—meaning the CPU will execute those gestures in sequence. The CN gesture shown is only compatible with processing gestures P1 and P3 (as the CN, P1 and P3 gestures include designation "b," while processing gesture P2 does not include the designation "b"). Thus, if a user initiates gesture CN followed by gesture P2, the latter will be ignored and/or the user will be alerted by a sound, icon, haptic feedback, or other altering means indicating that the gestures in sequence are not compatible. In terms of IDs, for example, the "C" in FIG. 3 identifies the gesture as a capture-based gesture; "P" identifies a processing-based gesture; and "S" identifies a sequence of gestures. As described above, any number of gesture types can be stored, referenced, or associated together. The gesture path column shows the motion of the gesture in one exemplar embodiment. The gesture paths in this example are shown in two dimensions, but it will be understood that gestures can be defined in multiple dimensions, such as three lateral dimensions and/or time (e.g., how long between successive motions), speed, acceleration, or other dimensions. Finger gesture paths are not shown, but it will be understood that any number of finger gesture paths can be included in the table—in any of the aforementioned dimensions—as well. The action column describes the action for the analysis unit to take. The listed actions are programmed into software readable by the CPU.

When the CPU 164 interprets gesture data as associated with capturing an image (e.g., gesture ID C1 in FIG. 3), the CPU 164 instructs the camera 102 to capture an image, and the CPU 164 saves that image into memory 166 as an image capture file (e.g., JPEG, PDF, TIFF, DNG, CR2, NEF, ARW, or other format). In one embodiment, the gesture unit 100 further includes a feedback device 118 for informing the user that a function (e.g., image capture) has been carried out. Feedback device 118 is controlled by instructions from CPU 164 to CPU 114 but can also be controlled by either CPU separately or in combination. The feedback device can be a speaker that produces a sound, an LED, a display, a haptic feedback device, or any other device capable of providing signals to a user. In one embodiment, the feedback device provides a sound, light, flash, display, vibration or other like signal to a user when a gesture is detected by one or more gesture units and interpreted by the analysis unit. In another embodiment, the feedback device provides different signals to alert the user as to which type of gesture was detected and interpreted. It will also be understood that different combinations of feedback can be provided depending upon the number and type of gesture units. For example, if a user has gesture units on more than one fingers, haptic feedback can be provided on different fingers depending upon the error or process being executed. For example, a haptic response might alert the user that the analysis unit has recognized text or faces of individuals in an image captured (or to be captured). In this way, and any number of other similar arrangements, the GBS is able to communicate with the user without the user directing his or her visual attention or hearing attention away from the object being captured or sought to be captured. It will be understood that the analysis unit may perform any of the foregoing functions alone or in combination with the gesture unit.

Further, in an alternative embodiment, either the gesture unit or the analysis unit includes a user input (not shown) such as a button, switch, touchscreen soft button, or voice activated command by which the user can enable/disable gesture detection.

When the CPU 164 interprets gesture data as associated with recording audio (e.g., gesture ID C2 in FIG. 3), the CPU 164 instructs the microphone 104 to begin capturing audio until the CPU 164 detects a stopping gesture, such as, for example, a repeated gesture associated with recording audio (e.g., gesture ID C2 in FIG. 3). Alternatively, the stop gesture can be a universal stop or cancel gesture the applies to all capture functions (e.g., applies to C2 and C3, depending on which has been most recently activated). The CPU 164 then saves the captured audio into memory 166 as an audio capture file (e.g., WAV, MP3, or other format). In one embodiment, the CPU 164 includes an internal time function to write a date stamp and time stamp into the audio file stored in memory 166.

When the CPU 164 interprets gesture data as associated with recording video (e.g., gesture ID C3 in FIG. 3), the CPU 164 instructs the camera 102 to begin capturing video until the CPU 164 detects a stopping gesture, such as, for example, a repeated gesture associated with capturing video (e.g., gesture ID C3 in FIG. 3) or a tap of one of the user's fingers to the palm (if optional finger gesture units are used). Alternatively, the stop gesture can be a universal stop or cancel gesture the applies to all capture functions (e.g., applies to C2 and C3, depending on which has been most recently activated). It should be noted that the camera 102 may be comprised of a still image camera and separate video camera. However, combined digital still-image and video cameras are well known, including, for example, those included on mobile phones with image and video recording capability. The CPU 164 then saves the captured video into memory 166 as an audio capture file (e.g., AVI, FLV, WMV, MOV, MP4, or other format). The CPU preferably includes an internal time function to write a date stamp and time stamp into the video file stored in memory 166.

It shall be understood that capture files and/or gesture files can be saved in memory 116 alone, memory 166 alone, and/or in a combination of both. Alternatively, memory 116 and memory 166 can be the same memory device. It shall also be understood than any manner of distributed storage or cloud storage of files can be used.

ID CN and the ellipses that precede it indicate that any number of capture-based gestures and actions can be stored in the database and/or called upon by a user. ID PN and the ellipses that precede it indicate that any number of processing-based gestures can be stored in the database and/or called upon by a user.

When the CPU 164 interprets gesture data as associated with storing without raw images, audio, or video frames (e.g., gesture ID P1 in FIG. 3); the CPU 164 processes the most recently captured file for information and then deletes the original captured (raw) data. This function can be used to save storage space in memory or to limit the type of information stored—it is described in more detail above in connection with FIG. 3.

When CPU 164 interprets gesture data as associated with publishing or displaying captured data (e.g., gesture ID P2 or P3 shown in FIG. 3), it creates a capture file and stores it in memory 166. The CPU 164 then appends gesture data and instructions to the capture file to create a gesture file. The CPU 164 then displays, publishes, modifies, or otherwise processes the file and then sends the file to be displayed, published, modified, or otherwise processed. For example, a user may initiate an image capture gesture to photograph a group of friends and then initiate a gesture associated with publishing the photo to a social media platform. As another example, a user may initiate an audio gesture to record someone's spoken telephone number or comments about a subject; initiate a store without raw images/audio gesture to transcribe the audio and then delete the raw audio data; and then initiate a gesture to send that transcribed audio it to an office document, contacts database, or other program that makes use of contact information. As another example, a user may initiate a photo gesture to photograph a group of individuals; initiate a store without raw images/audio gesture that will determine the identity of the individuals (e.g., by sending a downsampled version of the photo to a social media site capable of face recognition), store the identity of the individuals, and delete the raw image data; and then initiate a gesture to send the individual-identities (along with date, time, and location information) to an office document, contacts database, or program that makes use of contact information. As another example, a user may initiate a video gesture to record video of an event and then initiate a display gesture to send the image to either the display 170 of the analysis unit 150 or to a mobile phone to display the photo. The user may next initiate a gesture to publish the photo to a social media site.

In one embodiment, the processing of the gesture file takes place in the analysis unit 150, by the CPU 164 after the gesture file is sent by the transmitter 108 to receiver 160. In one embodiment, some or all of the capture file is displayed on display 170 (preferably a visual display) and/or speaker 172 of the analysis unit; such as, for example, on an analysis unit affixed to the user's, wrist, arm, ears, eyes, or other location. This processing includes, in one embodiment, detecting user position with positioning device 168 and appending position information to either the capture file or gesture file and/or updating location information in a gesture unit.

It will be understood that the gesture unit can be arranged to detect any number of gestures. Some examples of gesture-types include combined gestures (e.g., left-to-right and up-to-down could be combined into a upper-left-to-lower-right gesture), sequence gestures (e.g., left-to-right followed by up-to-down), contrasting gestures (e.g., using two gesture units, separating one's hands apart from one another or bringing them back together), speed gestures (e.g., quick left-to-right movement), timing gestures (e.g., tapping fingers quickly or pausing for a certain time or range of times between taps), handshake gestures (e.g., a gesture that is detected by one device and coordinates, through a wide area or local network or device-to-device communication, with another device to determine if a corresponding gesture has occurred), or a combination of the foregoing (e.g., a subsequent/contrasting/timing gesture such as up-to-down quickly followed by lower-left-to-upper-right slowly). Other gestures include complex gestures or relational gestures. For example sending a gesture file or other information to another user may include pulling one's wrist back over the shoulder and rapidly moving it forward, down, and across the body as if throwing a (figurative) ball in a specific direction, or bringing the user's hands together while closing the fingers to send an instruction to focus a camera at a projected intersection point of the hands while zooming in at an amount related to the rate at which the fingers close (or open, in the case of zooming out). In the case of the complex-relational, ball-throw gesture, the system may coordinate with another nearby device (e.g., over a wide area or local network or local device-to-device communication) to determine, for example, if a corresponding catch gesture (closing a user's fingers or palms and pulling back toward the user's body) before initiating publishing, modifying, sending, and/or other processing of information.

Any of the foregoing, in addition to any other type of gesture, can be arranged to control how the analysis unit processes the captured data, including but not limited to, where the data might be sent for publishing, display, or further processing. In one embodiment, a remote website or server (e.g., https://ifitt.com) is used to control publishing, display, or other processing.

Any of the foregoing can use distributed transaction and/or storage technology (e.g., blockchain) to record, process, and/or coordinate gestures. In one embodiment, a user controls which gestures coordinate with a distributed and/or storage technology and which are kept private for the user. For example, in one embodiment, the GBS includes a gesture that instructs the analysis unit whether to publish (or, alternatively, keep private) a subsequent (or, alternatively, previous) gesture. In one embodiment, one or more of the gesture units or analysis units includes a button or other user interface to control that functionality. In an alternative embodiment, the CPU 164 automatically determines (e.g., in connection with user settings or profiles set up ahead of time) whether and which gestures are private or to be public.

In one embodiment, the gesture unit and/or the analysis unit includes an application programming interface (API) or other like software block or command string to communicate with other gesture devices, mobile phone, online profiles or applications, or other social media or communication applications. As one example, a user may initiate a public gesture while clapping at a concert. In such instance the gesture unit detects gesture data from the user clapping and sends that gesture data to CPU 164 via transmitter 108 and receiver 160; the CPU 164 interprets the gesture data as applause and creates a capture file to which it appends time and location information (to create a gesture file); the CPU 164 then uses the network interface to communicate with a social media API and/or events website containing information about the location of Concert A to publish a notification that the user is enjoying Concert A. Alternatively, a user may initiate a public gesture while making a thumbs-down motion to publish on a social media site that the user is not enjoying Concert A. As another example, a user may use the GBS to photograph a plate of food at Restaurant B and provide a star-based review (e.g., by using a number of clicks or the finger or number of claps of the user's hands). As another example, a user may use a hail-gesture (e.g., waiving one hand over the user's head) to send location information to a transportation website to request a ride.

Figure 4:
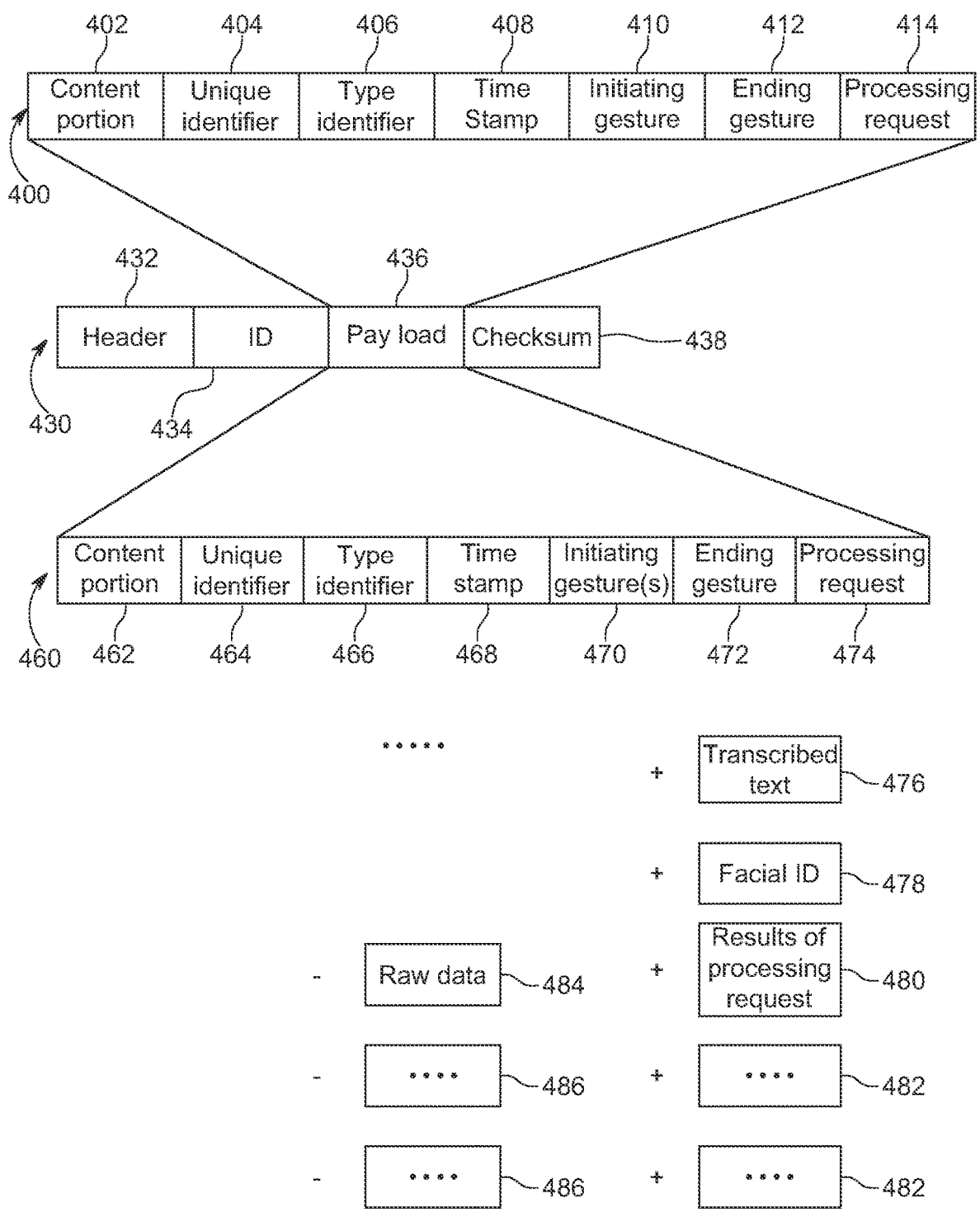
FIG. 4 shows one embodiment of how captured data is stored, transmitted, and processed.

FIG. 4 shows one embodiment of how gesture files are encoded (or modulated) for transmission and decoded (or demodulated) upon receipt. While FIG. 4 depicts a gesture file, it will be understood that the same process can be applied to capture files. Additionally, any known means of encoding/decoding and/or modulating/demodulating can be used. Reference 400 shows one embodiment of a gesture file store in memory 116 of the gesture unit 100. The gesture file contains content portion 402, which includes either the raw image data, raw audio data, raw video data, or other raw captured data. The gesture file also includes the unique identifier block 404, which contains information that identifies the captured data-set and distinguishes it from other data-sets. The gesture file also includes identifier block 406, which contains information that identifies the type of data captured (e.g., image, audio, and/or video). The capture file also includes the time stamp block 408, which contains information related to the date(s) and time(s) at which the capture occurred. Initiating gesture block 410 contains information that identifies the type of gesture that initiated the capture. The ending gesture block 412 contains information that identifies the type of gesture, if any, that ceased the captured (e.g., in the instance of audio or video capture). The processing request block 414 contains information that identifies what should be done with the gesture file or other information associated with the captured data (e.g., stored, modified, displayed, captioned, transmitted, sent to a remote server or website, and/or other such processing). By writing this information in the gesture file itself, the CPU 114 and CPU 164 (and any other logic device connected to CPU 114 and/or CPU 164) are able to share (or split, such as by parallel processing) the processing duties by writing what processing remains to be done into the file itself so that other logic units can interpret and execute remaining instructions.

Reference 430 shows one embodiment of a message packet format by which the transmitter 108 (and/or CPU 114) of the gesture unit 100 formats a gesture file for transmission to the receiver 160 of the analysis unit 150. The message packet includes a header 432, packet ID 434, payload 436, and checksum 438. In this embodiment, the header identifies the beginning of the message and number of bits included in the message; the ID identifies each individual message packet; the payload contains some or all of the gesture file and any associated data; and the checksum includes information the contents of a gesture file stored on the gesture unit and how it is converted into a message format (e.g., modulated or encoded) for transmission.

Reference 460 shows one embodiment of the gesture file stored in memory 166 of the analysis unit 150, after it has been assembled (e.g., decoded or demodulated) by the receiver 160 (and/or CPU 164) of the analysis unit 150. The gesture file contains content portion 462 (formerly content portion 402), unique identifier block 464 (formerly unique identifier block 404), identifier block 466 (formerly identifier block 406), time stamp block 468 (formerly time stamp block 408), initiating gesture block 470 (formerly initiating gesture block 410), ending gesture block 472 (formerly ending gesture block 412), and processing request block 474 (formerly processing request block 414). In alternative embodiments, either CPU 114 or CPU 164 (and any other logic device connected to CPU 114 and/or CPU 164) can add, remove, or modify blocks of data from the gesture file (or capture file).

References 476 (transcribed text), 478 (facial identification), 480 (results of processing request), and one or more appended information portion(s) 482 (any additional information to be associated with the file) show information that may be appended to the gesture file. References 484 (raw data, such as raw image, audio, or video, data) and one or more removed information portions 486 (any other captured data or appended data to be removed) show information that may be removed or deleted from either the gesture file. While FIG. 4 depicts the addition and/or removed taking place at the analysis unit, and such addition and/or removal can also take place at the gesture unit. In this way, any or all processing of the capture file or gesture file may be executed at one or more gesture units, analysis units, other connected or remote processing units, cloud processing units, or any combination of the foregoing. Thus the system is flexible in terms of distributing the processing load. For example, in the embodiment shown if FIG. 1, if the wrist-worn gesture unit 100 is of sufficient size that it can store a processor, large amount of memory, and sustainable battery, most or all of the processing can be accomplished by the CPU 114. However, in an alternative embodiment, where the only gesture units are smaller gesture units 103, the CPU of those gesture units might simply pass gesture data to the analysis unit 150. In such case, the analysis unit 150 will undertake most or all of the additional processing. Alternatively, in more sophisticated embodiments, the various processors can alter their processing loads throughout operation depending upon operational factors such as, for example, battery level of any of the gesture units or analysis units, which gesture is detected and interpreted, where various peripherals are located, etc. It will be understood that the system provides a great deal of flexibility in arranging various embodiments and distributing the processing demands throughout or across multiple gesture units and/or multiple analysis units.

Figure 5:
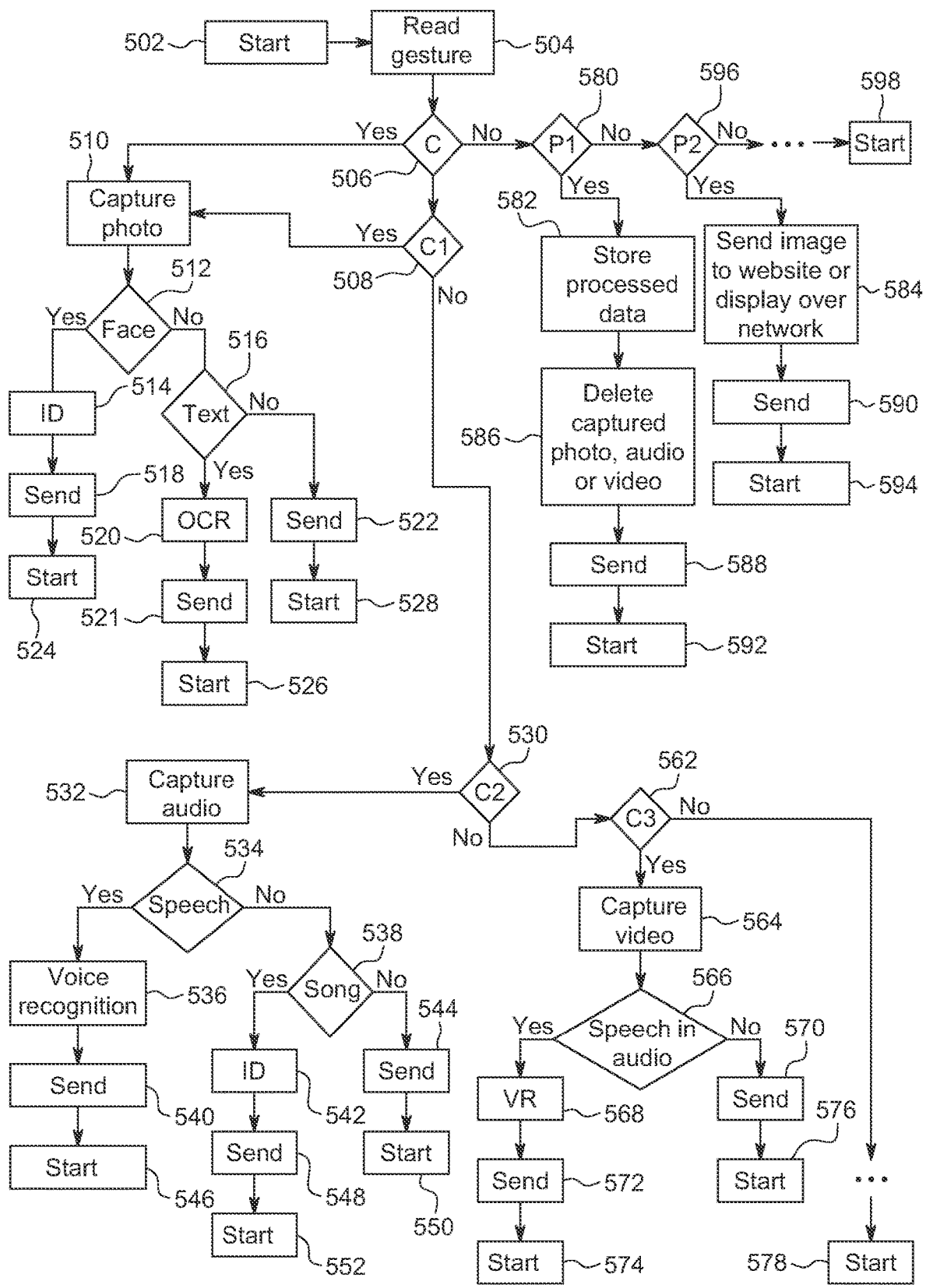
FIG. 5 shows a flow chart in connection with one embodiment of the present invention.

FIG. 5 shows a flow chart in connection with one embodiment of the present invention. Generally speaking, the decision points with respect to gestures C1, C2, and C3 show processes for capturing data based upon initiating gestures; the decision points with respect to gestures P1 and P2 show processes for processing the most recently captured data (stored in a gesture file). It will be understood that FIG. 5 shows just a few examples and that any number or types of gestures can be added to, nested in, or rearranged in FIG. 5.

The process begins at step 502 (Start). At step 504 the CPU 164 reads gesture data received from CPU 114 through a signal or signals from transmitter 108 to receiver 160 (and any necessary back-channel signals from transmitter 158 to receiver 110) to determine whether a gesture has been made. In one embodiment, CPU 164 executes the remaining steps shown in FIG. 5. But, as discussed above, the processing load can be shared between or among multiple CPUs, including CPU 114 by appending remaining steps into the gesture file. At step 506, it is determined whether a capture-gesture has been made. If a capture gesture has been made, the process proceeds to Step 508, which determines if gesture C1 has been made. If so, step 510 captures image data and preferably appends date, time, and/or geographic stamps to the capture file to form a gesture file. Step 512 determines whether the captured image includes faces. If so, step 514 identifies the faces using image processing and appends that information to the gesture file, step 518 sends the gesture file to the memory, and the processes returns to the Start 502 at step 524. If no faces are detected, step 516 determines whether the image contains text. If so, step 520 conducts optical character recognition on the image and appends that information to the capture file to form a gesture file, step 521 sends the gesture file to the memory, and the processes returns to the Start 502 at step at step 526. If no text is detected the gesture file (capture file with date, time, and/or geographic stamps) is sent to the memory at step 522, and the process returns to the Start 502 at step 528.

If gesture C1 is not detected at step 508, the processes moves to step 530. Step 530 determines if a gesture C2 has been made. If so, step 532 captures audio data and preferably appends date, time, and/or geographic stamps to the capture file to form a gesture file. Step 534 determines whether the captured audio includes speech. If so, step 536 conducts voice recognition and stores detected speech as text, step 540 sends the gesture file to the memory, and the processes returns to the Start 502 at step 546. If no speech is detected, step 538 determines whether the audio contains a song. If so, step 538 conducts pattern matching (e.g., U.S. Pat. Nos. 6,967,275; 5,857,171; 5,811,708; 6,121,530 and 5,447,438 and Japanese Publication Nos. 02235086A and 2000232761A—each of which is incorporated herein by reference) on the audio and appends that information to the capture file to form a gesture file, step 542 sends the gesture file to the memory, and the processes returns to the Start 502 at step at step 552. If no song is detected the gesture file (capture file with date, time, and/or geographic stamps) is sent to the memory at step 550, and the process returns to the Start 502 at step 560.

If gesture C2 is not detected at step 530, the processes moves to step 562. Step 562 determines if a gesture C3 has been made. If so, step 564 captures video data and preferably appends date, time, and/or geographic stamps to the capture file to form a gesture file. Step 566 determines whether the captured video includes speech. If so, step 568 conducts voice recognition and stores detected speech as text, step 572 sends the gesture file to the memory, and the processes returns to the Start 502 at step 574. If no speech is detected, the gesture file (capture file with date, time, and/or geographic stamps) is sent to the memory at step 570, and the process returns to the Start 502 at step 576.

If gesture C3 is not detected at step 562, the process undergoes any additional nested gesture determinations (indicated by ellipses . . . before step 579) and, if not, proceeds back to Start 502 at step 578.

At step 506, if a capture gesture has not been made, the process proceeds to Step 580. In this embodiment, only two types of gestures (C and P) are shown, thus no additional gesture type detection is needed. However, if more gesture types are added, step 506 will be split into a step of steps determining whether each type of gesture has been made instead of being a single yes/no determination.

Step 580 determines whether gesture P1 has been made. If so, the process proceeds to step 582 and stores the processed data in memory, then proceeds to step 586 to delete the captured raw data (e.g., raw photo file, raw audio file, or raw video file), then sends the gesture file (capture file-minus-raw-data with date, time, and/or geographic stamps) to memory at step 588, and then returns to Start 502 at step 592.

If gesture P1 is not detected at step 580, the process proceeds to step 596, which determines if gesture P2 has been made. If so, the process proceeds to step 584 and sends the image (or audio or video—not shown in FIG. 5) for display over either a network or via a website, then sends the gesture file (capture file with date, time, and/or geographic stamps) to memory at step 590, and then returns to Start 502 at step 594.

If gesture P2 is not detected at step 596, the process undergoes any additional nested gesture determinations (indicated by ellipses . . . before step 598) and, if not, proceeds back to Start 502 at step 598.

In one embodiment, the gesture based data capture and analysis system, either in whole or in part, operates in multiple states. For purpose of this discussion, and the embodiments herein, the situation in which the analysis unit or gesture units are powered down (or in a "powered-off" state) is not counted as one of the states (also referred to as the "non-power-off" states for additional convenience). (This is obviously not to say that the device cannot be powered off or powered off in response to a gesture but, rather, that there are at least two states other than a power off condition.) In each state the applicable processor (e.g., the processor in the analysis unit) includes a defined set of the gestures to which the analysis unit will respond, the amount or type of processing that can be performed, the type of data that can be captured, or any other set of functions or gestures or list of excluded functions or gestures while in such state. This is called the active state or the state in which the system is currently operating. Examples of states might include, for example, no-gesture-sensing (other than a gesture that might change the state), photo-ready, photo-capturing, video-ready, video-capturing, audio-ready, audio-capturing, processing ready, user review, awaiting confirmation, awaiting instructions, or others. In one embodiment, each state corresponds to a certain gesture, wherein the state is made active in response to such gesture. In one embodiment, the gesture to change a state from a "ready" state (e.g., photo-ready) into a "capturing state" in which data is being captured (e.g., photo-capturing), also corresponds to a gesture. For simplicity, the same gesture can be used to advance the device beyond a given ready state into a capturing state (e.g., the finger-to-palm gesture ("trigger")); the nature of the state that is active when the trigger gesture is conducted can control what type of data is captured, or if any response is provided. For example, when in the video-ready state, the trigger gesture will cause the peripheral to enter into the video-capturing state and capture video. When in the video-capturing state, the trigger gesture may cause no response, so as not to interrupt the video capturing. Alternatively, the trigger gesture may pause video capturing or cause the device to return to the video-ready state. These are a few non-limiting examples of what one of ordinary skill in the art will understand can be done using gestures (along with any other inputs) to a device or system that operates in multiple distinct states.

In another embodiment, the GBS-preferably the analysis unit, specifically-keeps a list (sometimes referred to in the art as a history, table, matrix, and/or other organized set of data) of states. In another embodiment, the analysis unit keeps a list of gestures. In another embodiment, the analysis unit keeps a list of processing actions. In another embodiment, the analysis unit keeps a list of data that were captured (e.g., photo, thumbnail image, video or down-sampled video preview, and/or text interpreted from audio) or the type of data that were captured (e.g., photo, video, audio). In other embodiments, any combination of the foregoing, or other information related to data capture and analysis, can be kept. For example, the foregoing lists may include index variables (e.g., a time stamp or a separate variable indicating the type of gesture, state, processing, and/or data interpreted, made active, accomplished or captured) indicating the approximate time at which each such event took place or was accomplished, initiated ended, or changed. In this context, it will be understood that variables can be defined to contain any kind of numerical or alphanumeric values, which includes Boolean values. In certain instances, a value associated with a given index variable may be stored in connection with each and every such item in the list. But that is not necessarily always the case. It will be understood that errors or missed values may occur, as well as making the determination to store a value next to only certain types of items in a list. As a non-limiting example, if a list that contains values for each item were to be merged with a list that does not contain a corresponding variable (or values), that merged list would contain values for "each" item. It will also be understood that two index variables could be concatenated into a combined variable but still contain the individual, variables.

Further, "approximate time" means that the values of the index variables (e.g., time stamp) do not need to be exact, such as, for example, down to a minute or second. For example, the variable could be designed to indicate a time relative to other events in the list or history. As one, non-limiting example, the following would indicate approximate times: a timeline showing a list of gestures activated on the current day, where the context makes clear that the timeline corresponds to the current day, where the descriptions of gestures are placed in order at which each corresponding gesture was interpreted, and where the spaces between the descriptions represent the relative periods of time in between each interpretation. For the avoidance of doubt, the foregoing may not include any numerical time values, but the approximate time would be clear to a user based upon the order and spacing of descriptions. The list could be combined or kept separate for each individual gesture or state. This could be done on alternative basis by combining or separating/sorting the lists based upon one or more of the index variables. Certain gestures may be used to indicate that all data captured during a certain state (e.g. the previous or a next state) will be processed similarly (e.g., sent to one webpage or presented to the user for selection via a display or remote device) or in seriatim, and/or according to another protocol for processing multiple sets of data captures.

Figure 6:
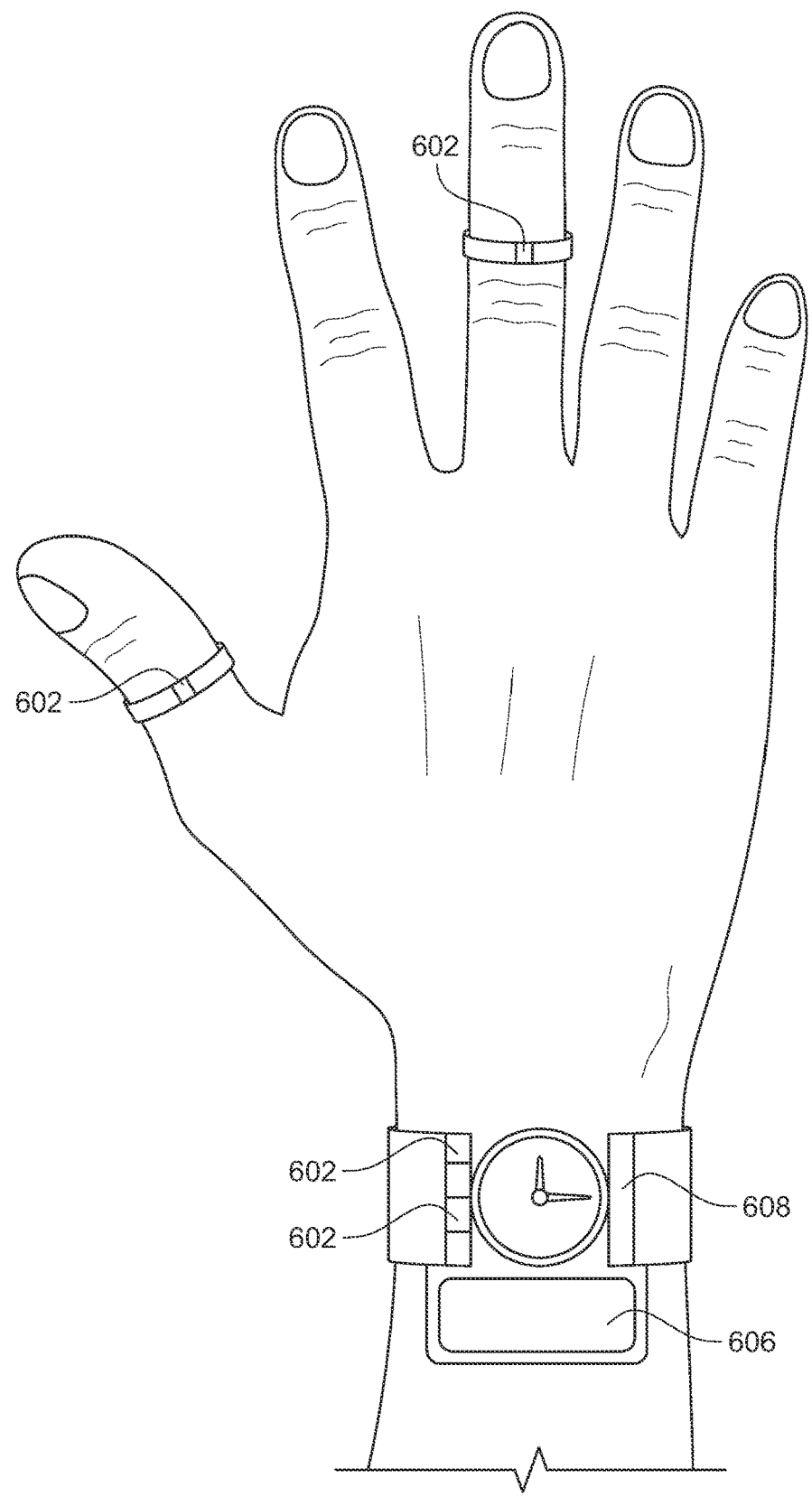
FIG. 6 depicts the backhand side of the embodiment of the gesture unit shown in FIG. 1.

FIG. 6 depicts the other side of the embodiment of the gesture unit shown in FIG. 1. It includes feedback units 602, shown in the form of LEDs next to a watch face. It also includes a haptic feedback unit 608, shown in the form of a vibrating component placed next to a watch face. It may also include an auditory feedback unit (not shown) in the form of a small speaker.

FIG. 6 further includes a display feedback unit 606, shown in the form of a general, flat display. In one embodiment, the display presents a user with a timeline of the data captured and processing requested (e.g., in response to gestures) and allows the user to approve or request the deletion or alteration of any of the foregoing events. Such user input can be done via gestures corresponding to process instructions, via touch elements on a touchscreen display, or via voice commands picked up by a peripheral capable of interpreting audible commands. Alternatively, the analysis unit may communicate with another remote device (such as a smart phone) to request and receive user commands. In one embodiment, the display presents a timeline at various intervals, either throughout the day and/or when requested by the user. This allows the user to review various types of data captured and then sort, approve, and control processing when the user is free and has time to do so (e.g., after a collaborative event ends and the user has self-time).

In one embodiment, the display keeps a running count of each type of data captured that has not been processed (e.g., number of videos, number of audio clips, and number of photos) and displays the count of each on a small portion of the display feedback unit. In another embodiment, one of the display feedback units 602 flashes or gives some other indication any time a data capture begins (e.g., flashes green and/or vibrates in a long pattern) and flashes or gives some other indication any time a data capture ends (e.g., flashes red and/or vibrates in a short or pulsed pattern).

The use of gestures to control capturing of data and processing of captured data as well as the use of feedback units indicating which state the GBS (or any part of the GBS) is in allows a user to capture multiple types of data (e.g., capturing photos in certain instances and capturing audio and video in other instances) in real time (e.g., during an event in which other individuals are in the same area and interacting with the user) without the user having to hold a peripheral (e.g., camera or microphone) in the user's fingers and without the user having to rely upon equipment that is not easily carried constitutes "real-time, on-person, hands-free, data capture."

It will be understood that any or all of the feedback units depicted in FIG. 6 could be used, as well as additional feedback units that are typically used by users of any electronic device, which can be run by standard processors. It will also be understood that feedback units can be affixed to and/or connected to any device. Feedback units may take the form of, for example, a heads up display on wearable headsets or glasses, ear buds or head phones, or other feedback devices.

What is claimed is:

1. A gesture-based data capture and analysis device, comprising:
   a gesture unit that is affixed to or carried by a user, but not held in the user's grip, and that is configured to detect one or more gestures made by the user;
   a peripheral that is affixed to or carried by the user, but not held in the user's grip, and that is configured to capture data; and
   an analysis unit that is affixed to or carried by the user that is connected to the gesture unit and to the peripheral, and that is configured to
   (a) interpret at least three different gestures based upon information obtained from the gesture unit,
   (b) operate in one of at least three different states, wherein each state is characterized, at least in part, by a set of gestures to which the analysis unit will respond when in such state and wherein at least three states are not power-off states,
   (c) in response to a first gesture from the user, select at least one of the states to be active,
   (d) in response to a second gesture from the user, wherein the second gesture is different from the first gesture, issue a command to one of the peripherals to cause it to capture data,
   (e) after data is captured, create a capture file containing the captured data,
   (f) in response to a third gesture from the user, wherein the third gesture is different from the first gesture and is different from the second gesture, append to the capture file a processing instruction as to how the capture file should be processed wherein the contents of the instruction are based upon the identity of the third gesture,
   (g) process the capture file according to the processing instruction, wherein the processing includes functions performed with discretionary user input that indicates user a preference or choice, and
   (h) in response to a gesture from the user, select to be active a state other than the currently active state.

2. The gesture-based data capture and analysis device of claim 1, further including a feedback unit that is affixed to or carried by the user, but not held in the user's grip, and that provides to the user an indication as to which of at least three non-power-off states is active.

3. The gesture-based data capture and analysis device of claim 2, wherein the feedback unit is a visual feedback unit.

4. The gesture-based data capture and analysis device of claim 2, wherein the feedback unit is a haptic feedback unit.

5. The gesture-based data capture and analysis device of claim 1, further including a feedback unit that is affixed to or carried by the user, but not held in the user's grip, and that provides to the user an indication as to which of at least three types of gestures was interpreted by the analysis unit.

6. The gesture-based data capture and analysis device of claim 5, wherein the feedback unit is a visual feedback unit.

7. The gesture-based data capture and analysis device of claim 5, wherein the feedback unit is a haptic feedback unit.

8. The gesture-based data capture and analysis device of claim 5, wherein the analysis unit is further configured to store a list of gestures that were interpreted and to store index values appended to the list that indicate the approximate time at which gestures were made.

9. The gesture-based data capture and analysis device of claim 1, further including at least two total gesture units: (a) one gesture unit that is configured to detect finger gestures and (c) one gesture unit that is configured to detect non-finger gestures, such as the movement of the user's arm.

10. The gesture-based data capture and analysis device of claim 9, further including a feedback unit that provides the user a first indication at approximately the point in time when a data capture event begins and provides the user a second indication at approximately the point in time when the data capture event ends, wherein the second indication is different than the first indication.

11. The gesture-based data capture and analysis device of claim 1, further including a feedback unit and wherein the analysis unit is further configured to analyze captured data to determine whether the captured data includes an image that corresponds to one or more faces and to provide to the user feedback indicating whether the captured data includes an image that corresponds to one or more faces.

12. The gesture-based data capture and analysis device of claim 1, wherein the analysis unit is further configured to interpret at least the following gestures: (a) a gesture that causes to be active a state in which the analysis unit will respond to a gesture corresponding to photo capture and (b) a gesture that causes to be active a state in which the analysis unit will not respond to a gesture corresponding to photo capture and in which the analysis unit will receive one or more instructions describing text that will accompany a previously captured photo or set of photos.

13. The gesture-based data capture and analysis device of claim 12, wherein the analysis unit is further configured to store a list of data that were captured, to store index values appended to the list that contain information describing the type of data captured, and to store index values appended to the list that indicate the approximate time data captures were made.

14. The gesture-based data capture and analysis device of claim 13, further including a display connected to the analysis unit, wherein the display is configured to display to the user (a) information obtained from the list and (b) information corresponding to one or more values of the index values.

15. The gesture-based data capture and analysis device of claim 14, wherein the display is further configured to display to the user a visual timeline indicating the types of data captured wherein the set of available types that can be displayed includes image and video data.

16. The gesture-based data capture and analysis device of claim 1, further including a feedback unit that, following interpretation of a gesture, provides a signal to the user requesting confirmation that the interpretation of the gesture was correct and wherein the analysis unit is further configured to receive a signal from the user indicating that the user confirmed that the interpretation of the gesture was correct.

17. The gesture-based data capture and analysis device of claim 16, further including a display connected to the analysis unit and wherein the analysis unit is further configured to (a) store a list of gestures that were interpreted, (b) store index values appended to the list that indicate the type of gestures, (c) store index values appended to the list that indicate the approximate time gestures were made, and (c) display to the user a visual timeline indicating the type of gestures that were made.

18. The gesture-based data capture and analysis device of claim 16, further including a display connected to the analysis unit and wherein the analysis unit is further configured to (a) store a list of data sets that were captured, (b) store index values appended to the list that contain information describing the type of data captured, (c) store index values appended to the list that indicate approximate time data captures were made, and (d) cause the display to display to the user a visual timeline indicating the type of two or more of the captured data sets.

19. A method of capturing and processing data in response to a gesture made by a user, comprising:
- detecting with a motion capture device at least one gesture made by a user out of a group of at least four different gestures capable of being detected;
- in response to a first gesture, capturing data with a peripheral;
- identifying the first gesture based upon gesture identifying information contained in a database, wherein the gesture identifying information includes one or more index value;
- in response to a second gesture, wherein the second gesture is different from the first gesture, storing an instruction from the user that controls how the captured data will be processed, wherein the processing of captured data includes functions performed with discretionary user input that indicates user a preference or choice;
- storing in memory, a list of types of data that were captured;
- storing in memory index values that indicate the approximate times of data capture; and
- presenting to the user, at approximately the time of data capture, feedback indicating the type of data in the process of being captured without the user having to hold a feedback device in the user's grip.

20. The method of claim 19, further including the steps of (a) providing a signal to the user requesting confirmation that the interpretation of a gesture corresponds to a gesture the user intended to make and (b) receiving a signal from the user confirming that the interpretation of the gesture corresponds to a gesture the user intended to make.

* * * * *